United States Patent [19]
Peterson et al.

[11] 3,809,442
[45] May 7, 1974

[54] LOW-FRICTION SLIDE BEARINGS

[75] Inventors: Arthur H. Peterson; Galen C. Britz, both of Maplewood, Minn.

[73] Assignee: Minnesota Mining and Manufacturing Company, St. Paul, Minn.

[22] Filed: Dec. 4, 1972

[21] Appl. No.: 312,190

[52] U.S. Cl............... 305/14, 252/12, 308/238, 305/35 EB, 305/14
[51] Int. Cl............... B62m 27/02, B62d 55/24
[58] Field of Search .... 180/5 R; 305/24, 14, 35 EB; 308/238; 252/12

[56] References Cited
UNITED STATES PATENTS

| | | | |
|---|---|---|---|
| 3,441,328 | 4/1969 | Hurley | 308/238 |
| 3,516,941 | 6/1970 | Matson | 252/316 |
| 3,567,504 | 3/1971 | Hopkins | 308/238 |
| 3,722,961 | 3/1973 | Haley | 305/38 |
| 3,738,714 | 6/1973 | Ness | 305/35 EB |

*Primary Examiner*—Richard J. Johnson
*Attorney, Agent, or Firm*—Alexander, Sell, Steldt & DeLaHunt

[57] ABSTRACT

A suspension and driving system for use on moving belts such as snowmobile tracks and conveyer belts comprises a flexible belt which is in sliding contact with support means and driving means to move the belt. The moving belt or its support means is equipped with a hard, low-friction bearing surface comprising isocyanurate resin and a lubricant. The isocyanurate-lubricant bearing surface rides on a metal or polymeric surface providing a replaceable low-friction slide bearing.

14 Claims, 5 Drawing Figures

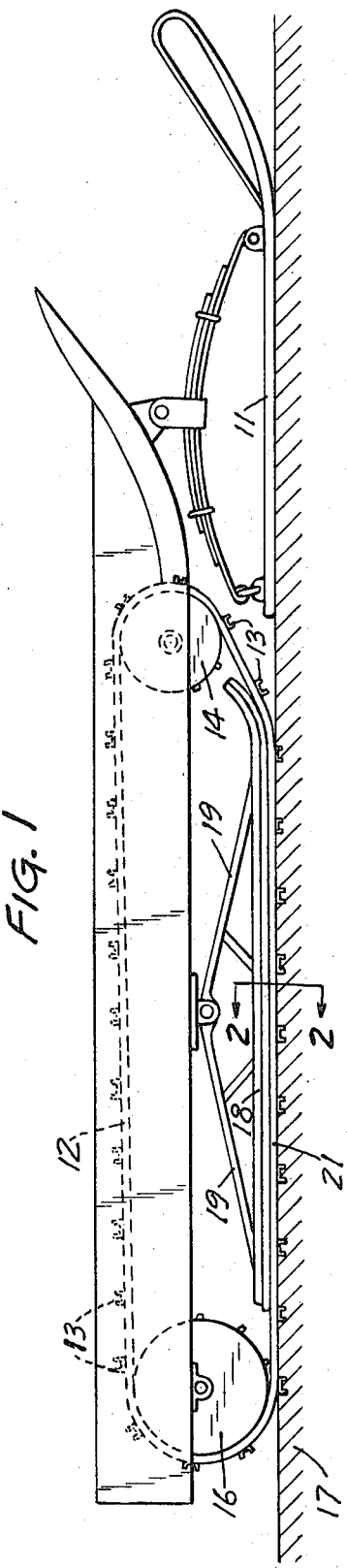
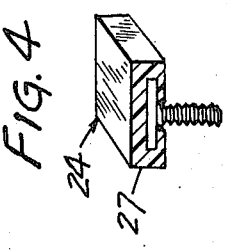
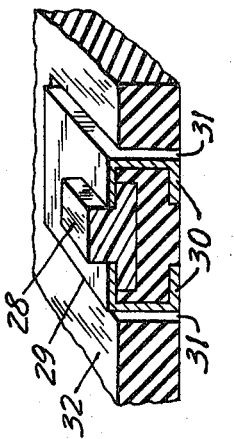
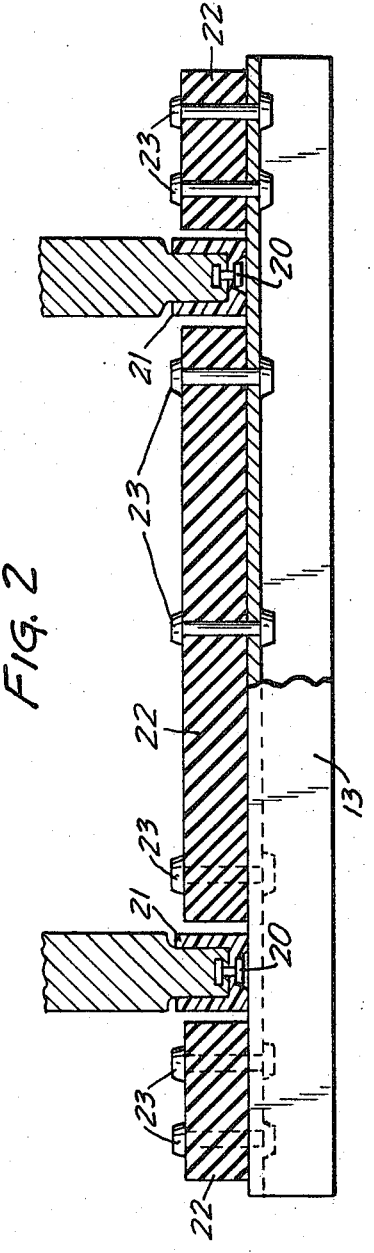
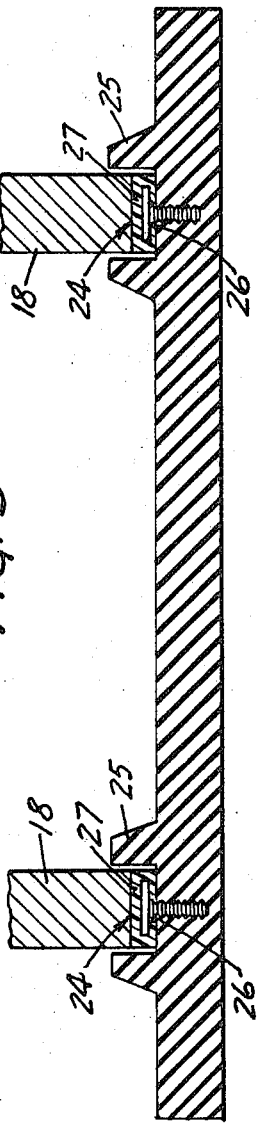

LOW-FRICTION SLIDE BEARINGS

BACKGROUND OF THE INVENTION

1. Field of the Invention

This invention relates to an improved transport belt and support structure and in one aspect to an improved belt and support for snowmobiles.

2. Description of the Prior Art

There exist various mounting systems for use with the endless drive tracks common for snowmobiles and other endless belts which are in sliding friction with a support. For snowmobiles such systems include the use of slide rails which support the drive track and maintain contact between the ground and the driving track. The mounting systems presently in use engage the inside of the lower drive run of the flexible drive track holding the track in contact with the surface which the vehicle is traversing. The slide rail systems presently used are made of metal with a polymeric material attached thereto, e.g. ultra high molecular weight polyethylene. Slide rails surfaced with such polymeric materials provide an effective support but the polymeric material wears rapidly, particularly with a loss of lubricant requiring frequent replacement of the polymeric portion of the slide rail. When crossing dry spots in the terrain where the lubricant normally furnished by melted snow or ice is absent, erosion of the polymeric material is accelerated due to the heat of increased friction. Under dry conditions the buildup of heat in the polymeric material causes degradation and an increased rate of wear destroying the polymeric portion of the rail often in a mile or so. Prior to this invention the bogie wheel suspension system for the belt was the only system in the snowmobile industry which would function for extended periods in the dry or semi-dry conditions often encountered in normal snowmobile habitat and which also functioned in a normal manner when lubricated from the moisture present in the surroundings.

Other areas where a slide bearing is used to support or maintain an endless belt or chain in a desired plane includes convyers in packaging, mining, curing and drying ovens, and farms. Abrasive maker ovens presently in use, use slide rails which are formed from hard wood, e.g. maple, which can withstand the operating temperatures of 100° F. to 300° F. The wooden rails normally dry out and fail in three months to a year due to splitting caused by drying of the wood. Farm and mining operations have many belt and conveyer systems where an endless belt slides over a supporting rail generally formed of metal. Such belts and rails require frequent lubrication in order to perform at peak efficiency and prevent excessive wear.

A further endless belt-sliding friction situation involves a bearing for providing tension on a moving chain. The tension bearings presently in use are generally formed of polymeric materials and the bearing assembly is enclosed in an oil filled enclosure. If there is a loss of lubricant the wear on the polymeric tension bearing due to sliding friction between the bearing and the chain will cause a rapid failure of the polymeric bearing.

SUMMARY OF THE INVENTION

We have found that a suspension system for a moving endless belt can be formed which will give satisfactory performance and service when exposed to a variety of ambient conditions including dry friction and elevated temperatures. Such a system comprises one or more support means for an endless belt, the support means being surfaced with a hard, wear resistant, self-lubricating isocyanurate resin containing a lubricant, e.g. wax or molybdenum disulphide. Alternatively, the support means can ride on a plurality of isocyanurate-lubricant buttons, said buttons being imbedded in or attached to the side of the endless moving belt contacting the supporting means. Both embodiments provide a hard, self-lubricating suspension system where the isocyanurate-lubricant surfaces are long wearing and easily replaced when worn, and the endless belts will have an extended life.

BRIEF DESCRIPTION OF THE DRAWINGS

A better understanding of the invention can be had by referring to the accompanying drawing in which like reference numbers refer to like parts in the several views, and where:

FIG. 1 is a fragmentary side elevational view of the endless belt of a snowmobile;

FIG. 2 is an enlarged fragmentary transverse sectional view of a drive belt supported by slide rails according to this invention;

FIG. 3 is an enlarged fragmentary transverse sectional view of an alternative drive belt and supporting slide rail structure according to this invention;

FIG. 4 is a perspective view in partial section of a self-lubricating button according to the present invention; and FIG. 5 is a detail view in section of a second embodiment of a self-lubricating button attached to a drive belt.

DETAILED DESCRIPTION OF THE INVENTION

Referring particularly to the accompanying drawing, a snowmobile 10 is shown having an elongated body with skis 11 mounted at the front of the snowmobile frame for the purpose of steering. The snowmobile is propelled forward by an endless belt 12 having a plurality of spaced traversely extending, steal cleats 13 for traction. The endless belt 12 is driven by driving wheel 14 which receives power from a motor (not shown) and the belt is supported at the rear of the snowmobile by an idler wheel 16. The endless drive belt or track is supported and maintained flat against the terrain ice or snow 17 by a slide rail suspension combination. The metal slide rail 18 is supported by supports 19 which allow some relative motion of the slide rail to the vehicle as the vehicle moves over a surface discontinuity. The metal slide rail 18 is surfaced by an elongate strip 21, U-shaped in cross-section to fit the rail 18, or hard, self-lubricating isocyanurate-lubricant bearing material which strip rides on an exposed edge of the steel cleats 13 which join the endless segments 22 of flexible belt material as shown in FIG. 2.

The metal driving cleats 13 are fastened to the driving belt segments 22 with a plurality of rivets 23. A self-lubricating isocyanurate-lubricant bearing strip 21 is attached to the metal slide rails 18 by means of rivets 20 forming a slide rail system which is self-lubricating under dry conditions.

Another embodiment of a low-friction slide bearing of this invention is shown in FIG. 3 where a one-piece polymeric endless belt 23 is supported and guided by means of metal slide rails 18. The belt has parallel molded ribs 25 forming guides for the rails. The rails do not make contact with the inner surface of the polymeric belt 23 but ride on a plurality of spaced buttons 24 which comprise a metal screw or stud 26 and a layer 27 of isocyanurate-lubricant bearing material molded over and surfacing the head of the screw or stud. The shank of each screw or stud 26 has threads 28 for fastening the button to a threaded receptable in the belt permitting the button to be fastened to and disengaged from the drive track 23 permitting new buttons to be inserted when the bearing material on one button is expended.

Another form of replacable bearing is shown in FIG. 5 where the isocyanurate-lubricant bearing material is formed "T" shaped in cross section and which has the leg projecting through a corresponding opening in the bight portion of a U-shaped clamp 29. The clamp 29 with the bearing material positioned in the clamp 29 is inserted with the flanges 30 of the clamp 29 passing through slots 31 in the polymeric drive belt 32. The flanges are then bent toward each other to hold the block to the belt and to make a low-friction slide bearing system similar to that depicted in FIG. 3.

In the embodiments as shown, the self-lubricating isocyanurate-lubricant bearing material is disposed so as to slide on a metal surface, e.g. metal cleats or the metal surface of a supporting slide rail. The bearing material could be positioned so as to slide against another polymeric surface; however, this configuration will not dissipate heat as effectively as a metal-polymer interface. The resultant heat causes problems such as shortened bearing life and sticking of the hot bearing material to the polymeric surface when the belt is stopped and allowed to cool with the heated surfaces in contact. It is preferable that the bearing material ride on a metallic surface in order to avoid the problem of sticking but it is possible and within the scope of this invention for the bearing material to ride directly on a polymeric belt or other polymeric surface.

The organic thermoset isocyanurate polymers useful in this invention have been reported in the literature. They may be prepared from organic polyisocyanates including mixtures thereof with polyols or polyamines by trimerization of the polyisocyanate moiety in the presence of a suitable catalyst, preferably a catalyst which permits polymerization at room temperature. The organic polyisocyanate reactant materials are known in the prior art (e.g. see U.S. Pat. No. 3,054,755). They can be represented by the general formula $R(CO)_n$, where R is aryl, alkyl, or cycloalkyl, and "$n$" an integer of 2 to 5. Polyisocyanates can be polymerized or trimerized to form cross-linked polyisocyanurates, such isocyanates being trimerized per se or in admixture with a compound having at least two active hydrogen atoms, e.g. a polyol or polyamine. Representative polyisocyanates which can be used are aromatic polyisocyanates such as tolyenediisocyanate, diphenylmethane diisocyanate and xylene diisocyanate. Tolylene-diisocyanate especially mixtures of 2,4— and 2,6—isomers thereof, such as a mixture of 80 weight percent 2,4—tolylene diisocyanate and 20 weight percent 2,6—tolylene diisocyanate; phenylene diisocyanate; hexamethylene diisocyanate; and 3,3'—dimethyl-4,4' diphenylene diisocyanate. Other useful polyisocyanates include polyisocyanate compositions obtained by phosgenating the polyimates prepared by condensing formaldehyde with aromatic amines. A list of useful commercially available polyisocyanates is found in "Encyclopedia of Chemical Technology", Kirk-Othmer, Second Edition, Volume 12, pages 46–47, Interscience Publishers, New York (1967).

NCO terminated-urethane prepolymers can also be trimerized to produce poly(urethane-isocyanurates), i.e., urethane-modified polyisocyanurates). Such prepolymers can also be used in admixture with polyols and the mixture catalyzed to produce products with both urethane and isocyanurate linkages. When such prepolymers are used in admixture with primary or secondary amines, the products contained both urea and isocyanurate linkages. Such NCO-prepolymers are well known (see U.S. Pat. Nos. 3,073,802 and 3,054,755) and are generally prepared by reacting an excess of polyisocyanate, such as an aromatic diisocyanate with polyalkylene ether polyols or polyester polyols. The isocyanate can also be used in the form of a blocked isocyanate.

The polyol component of a polyisocyanate-polyol reaction mixture is preferably a low molecular weight polyalkylene ether polyol, but may also be a low molecular weight non-polymeric polyol, or a polyester or polyesteramide containing reactive hydroxyl groups. The preferred polyols have a molecular weight between about 200 and 3000 although polyols having a molecular weight up to about 5,000 are useful. Where a hard, wear resistant product is desired as in this invention, the polyol preferably should have an average polyol or hydroxyl equivalent weight between about 130 and 400 (i.e. one active OH group per 130 to 400 molecular weight polymer).

Examples of the preferred polyether polyols are polypropylene ether polyols or polybutylene ether polyols. The preferred polyalkaline ether polyols are condensates of ethylene, propylene, or butylene oxide such as polypropylene ether glycol, polyethylene ether glycol, or polybutylene ether glycol.

Generally, the polyol-polyisocyanate reaction mixtures can have NCO/OH equivalent ratios in the range of 0.8/1 to 12/1, and even higher, e.g. 20/1 to 50/1; the preferred range is at least 1.2/1 since below the latter the product will contain unreactive or free hydroxyl groups (which have a plasticizing function) and the result will be a more flexible product generally not suited for forming slide bearings.

Many catalysts are useful for the preparation of polyisocyanurate polymers (e.g. see "Poly-urethanes: Chemistry and Technology", Part I, by J. H. Saunders and K. C. Frisch, Interscience Publisher, New York (1962), page 84, and U.S. Pat. Nos. 2,965,614; 2,979,485; 2,993,870; and 3,635,848). The amount of catalyst used in polymerizing the isocyanate or polyol-polyisocyanate reaction mixtures of this invention will vary, depending on the particular catalyst reactant used and desired activity of the catalyst. Generally, the amount of catalyst to use will be less than 10 weight percent of the isocyanate. Functionally stated, the amount of catalyst to use will be that amount sufficient to catalyze the polymerization or trimerization of the reaction mixture at the desired temperature which is preferably room temperature.

When in the practice of this invention a higher cross-linked or chain-extended product is desired, the reaction mixture can include a conventional trifunctional isocyanate or a triol. The reaction mixture can also be modified by including monoisocyanates or alcohols such as 1,4 butanediol, butylcellosolves, butylcarbitol, etc. to impart special properties to the polymer product, such as the degree of final hardness and impact resistance.

The lubricant forming the discontinuous lubricant phase in the isocyanurate-lubricant slide material used in this invention may be any of a wide variety of inert lubricating materials which generally exist in a fluid form at some point within the operating temperatures of the composition to be used usually 140°F. to 200°F.), and the selection is normally made on this basis. Thus, if the composition is subjected to an extreme load as is the slide bearing of this invention, where higher temperatures are generated or encountered, the lubricant is preferably one which becomes fluid without volatilizing at the elevated temperatures and has a higher viscosity at those higher operating temperatures. For lighter-duty load slide bearing conditions, the lubricant is preferably one which becomes fluid at the lower temperature reached in such service. If the lubricant is normally liquid at the temperature used for forming the thermoset polymer, such as an oil in room temperature reactions, the lubricant may be more effectively dispersed through the thermosettable components prior to their cure if it is contained within microcapsules as shown in U.S. Pat. No. 3,516,941, thereby preventing the liquid lubricant from coalescing or separating from the polymeric matrix during the thermosetting reaction. Illustrative non-aqueous materials include; low-melting thermoplastic low friction polymers, petroleum based oils and greases, silicone oils and waxes, (particularly the paraffin waxes and especially those with an inherent coefficient of friction of about 0.08 to 0.12), or higher polydiglycols (such as "Carbowax" a trade-marked product of Union Carbide Co.). The viscosity index of a lubricant should be selective so as to minimize lubricant loss under the intended load situation in use, and viscosity improvers or aids may be added for this purpose. The "solid" lubricants, i.e. those which do not become fluid and flowable even in the higher temperature ranges, such as graphite, molybdenumdisulfide, polytetrafluoroethylene, and the like are useful as lubricants of this invention under conditions of elevated temperatures.

EXAMPLE 1

An isocyanate-terminated prepolymer was made by reacting 155 parts methylene bis(phenylisocyanate) with a mixture of 23.75 parts propylene ether glycol (200 molecular weight) and 26 parts of polypropylene ether glycol (2000 molecular weight). The resulting isocyanate-terminated prepolymer had a viscosity of 1840 cps and an isocyanate number of 216. The catalyst was made by mixing 675 grams (4.5 moles) of triethyleneglycol and 46.5 grams (0.75 mole) of powdered boric acid with a three blade mixer, and the mixture was degassed under 28 inches Hg of vacuum. The resulting mixture was heated to about 130°C. under vacuum until the evolution of water ceased. It was then cooled to about 60°C. and a total of 42 grams (0.75 mole) of potassium hydroxide was added in three proportions. After the addition was complete, the reaction mixture was heated to 130°C. under vacuum until the water by-product was removed and was then cooled. The tetralkoxyborate ester, $[B(O-CH_2CH_2-O-CH_2CH_2-O-CH_2CH_2OH)_4]^- K^+$ in excess triethylene glycol (1.5 moles), was an amber colored liquid with a K/B atom ratio of 1/1.

The lubricated slide bearing parts were made by taking 200 parts by weight of the isocyante-prepolymer and adding 45 parts of the spheroidized-wax lubricant particles ("Shell Wax" 200 having a melting point of about 140°F.) This mixture was stirred thoroughly with a three blade mixer and degassed under 28 inches of vacuum. To 100 parts of the polypropylene oxie triol was added 3 parts of the tetralkoxyborate ester catalyst. The two mixtures were then mixed together carefully to insure minimal air inclusion and again degassed under 28 inches of mercury vacuum. The catalyzed mixture was poured into molds and allowed to thicken and gel at room temperature for 45 minutes. Postcure in an oven was performed first for 45 minutes at 125°F. and then an additional 45 minutes at 200°F. The cured resin and molds were allowed to cool and the resin parts removed from the mold and machined to the finished dimension.

The isocyanurate slide rails were installed on snowmobiles tested and compared to slide rails of comparable size having a surface of polyethylene. The rails as installed had a configuration like FIG. 2. Test conditions include sand, gravel and snow and the tests were run for about 158 miles in 20°–30°F. weather. The wear data are tabulated in Table I.

TABLE I

| Rail Material | Rail Wear Rate Per 500 Mi. | Conditions |
|---|---|---|
| Polyethylene | 0.406 in. | Sand, snow, gravel |
| Isocyanurate-wax | 0.179 in | Sand, snow, gravel |
| Isocyanurate-wax | 0.064 in. | Snow (only) |

Although wear rate is obviously a function of the ambient conditions, the isocyanurate-wax slide rails had about 2.3 times the wear resistance of comparable conventional polyethylene surfaced slide rails under severe conditions.

EXAMPLE 2

Slide rails suitable for use in the chain track of curing and drying ovens for abrasive webs were formed. The slide rails were 8-½ feet long by 2-¼ inches wide and 1 inch thick. The isocyanurate-lubricant slide rails were formulated using 500 parts of the isocyanate terminated prepolymer and 100 parts of the polyoxypropylene triol of Example 1. Two types of lubricants were added (1) spheroidized paraffinic wax ("Shell Wax" 700), melting point about 180°F., or (2) powdered $MoS_2$ having a particle size up to 62 microns. The reaction mixtures were processed using the procedure and catalyst of Example 1, the type of lubricant, parts by weight of lubricant, and parts by weight catalyst being given in Table II.

TABLE II

| Formulation | Parts catalyst | Type of lubricant | Parts lubricant | Furnace operating temperature, °F. | Comments |
|---|---|---|---|---|---|
| 1 | 10.6 | "Shell Wax" 700. | 106 | 200–300 | No wear after 2,500 hours. |
| 2 | 10.6 | "Shell Wax" 200. | 106 | 70–140 | No wear after 600 hours. |
| 3 | 9.3 | $MoS_2$ | 18.6 | 200–300 | No wear after 2,500 hours. |

The rails made from the above materials were installed in a 200°–300°F. curing oven supporting a web on an endless chain conveyer passing through the hot ovens. The isocyanurate wax slide rails were operated without any additional lubricant; however, the wood portions of the rails were lubricated with oil and some of the oil was carried by the chain onto the polymeric material. There was no sign of wear after 2500 hours of continuous operation, the slide rails continuing to operate normally under the elevated temperatures. In contrast the hard maple slide rails which were alternately spaced in the chain track with the isocyanurate-wax section were lubricated at approximately weekly intervals and may begin to show failure due to initial drying out and subsequent cracking of the wood after about 1200 hours of service.

What is claimed is:

1. A suspension system for endless belts comprising:
a flexible endless belt;
a load bearing surface in sliding contact with sad belt, supporting said belt as it slides over said bearing surface;
a plurality of hard, self-lubricating resin inserts, said resin comprising a polyisocyanurate resin and a discontinuous phase of a lubricant material, said inserts being attached to the surface of the belt to contact the load bearing surface and to be in sliding contact with said load bearing surface.

2. The suspension system of claim 1, wherein said flexible endless belt is a polymeric drive belt for use on power vehicles.

3. The suspension system of claim 1, wherein said load bearing surface is a slide rail.

4. The suspension system of claim 3, wherein said slide rail is surfaced with a self-lubricating resin comprising a polyisocyanurate and a discontinuous phase of a lubricant material.

5. The suspension system of claim 1, wherein said lubricant is molybdenum disulphide.

6. The suspension system of claim 1, wherein said lubricant is a paraffin wax.

7. A suspension system for endless belts comprising:
a flexible endless belt;
a load bearing surface in sliding contact with said belt, said bearing surface having disposed thereon a hard, self-lubricating resin comprising a polyisocyanurate resin having dispersed therein a discontinuous lubricant phase in sliding contact with said belt.

8. The suspension system of claim 7, wherein said discontinuous lubricant is molybdenum disulphide.

9. The suspension system of claim 7, where said discontinuous lubricant is graphite.

10. The suspension system of claim 7, where said discontinuous lubricant is paraffin wax.

11. A replaceable button suitable for use in combination with an endless belt and a supporting slide means, said button comprising:
a shaped block of self-lubricating isocyanurate-lubricant material; and
a fastening means to hold said block on said belt and in contact with said slide means.

12. The replaceable button of claim 11 wherein said fastening means is a threaded stud and said shaped block of self-lubricating material covers the head on said fastening means.

13. The replaceable button of claim 11, wherein said shaped block of self-lubricating material is a "T" shaped block and said fastening means is a U-shaped clamp with an opening through the bight thereof, the leg of the "T" shaped block passing through said opening, the flanges of said U-shaped clamp being spaced and generally parallel for insertion in corresponding apertures in said endless belt whereby said flanges can be bent toward each other to hold said button on said belt.

14. A suspension system for endless belts comprising
a flexible endless belt;
a fixed load bearing surface positioned to contact said belt slidably at an interface upon movement of said belt along its desired path; and
means surfacing said interface between said belt and said load bearing surface, said means comprising at least one member comprising a hard polyisocyanurate resin and a discontinuous phase of lubricant material secured to said surface.

* * * * *